(12) United States Patent
Ferrarese

(10) Patent No.: US 11,446,977 B2
(45) Date of Patent: Sep. 20, 2022

(54) AIR DISTRIBUTING DEVICE FOR AN AIR CONDITIONING UNIT OF A MOTOR VEHICLE

(71) Applicant: DENSO THERMAL SYSTEMS S.p.A., Turin (IT)

(72) Inventor: Claudio Ferrarese, Turin (IT)

(73) Assignee: DENSO THERMAL SYSTEMS S.P.A., Turin (IT)

( * ) Notice: Subject to any disclaimer, the term of this patent is extended or adjusted under 35 U.S.C. 154(b) by 457 days.

(21) Appl. No.: 16/591,491

(22) Filed: Oct. 2, 2019

(65) Prior Publication Data

US 2020/0108685 A1 Apr. 9, 2020

(30) Foreign Application Priority Data

Oct. 3, 2018 (IT) .......................... 102018000009130

(51) Int. Cl.
*B60H 1/00* (2006.01)
*B60H 1/24* (2006.01)

(52) U.S. Cl.
CPC ..... *B60H 1/00035* (2013.01); *B60H 1/00564* (2013.01); *B60H 1/00685* (2013.01); *B60H 1/242* (2013.01); *B60H 1/244* (2013.01); *B60H 2001/002* (2013.01); *B60H 2001/00092* (2013.01); *B60H 2001/00721* (2013.01)

(58) Field of Classification Search
CPC ............ B60H 1/00035; B60H 1/00564; B60H 1/00685; B60H 1/242; B60H 1/244; B60H 2001/00092; B60H 2001/002; B60H 2001/00721
See application file for complete search history.

(56) References Cited

U.S. PATENT DOCUMENTS

| 5,350,335 | A  | * |  9/1994 | Andersson | ......... B60H 1/00685 |
|---|---|---|---|---|---|
|  |  |  |  |  | 454/121 |
| 9,724,977 | B2 | * |  8/2017 | Ju | ....................... B60H 1/00021 |
| 10,155,427 | B2 | * | 12/2018 | Aizawa | .............. B60H 1/00592 |
| 11,186,140 | B2 | * | 11/2021 | Ferrarese | ........... B60H 1/00685 |
| 2018/0162191 | A1 |  |  6/2018 | Lee et al. |  |

FOREIGN PATENT DOCUMENTS

| EP | 551754 A1 * | 7/1993 | ......... B60H 1/00685 |
|---|---|---|---|
| EP | 2740619 A1 | 6/2014 |  |
| JP | S57209414 A | 12/1982 |  |

OTHER PUBLICATIONS

Talian Search Report and Written Opinion for IT Patent Application No. 10201800009130, dated Jun. 24, 2019, 7 pages. No English Translation available.

* cited by examiner

*Primary Examiner* — Marc E Norman
(74) *Attorney, Agent, or Firm* — Armstrong Teasdale LLP

(57) ABSTRACT

Described herein is air distributing device for an air conditioning unit of a motor vehicle, the device including: a housing defining an air intake chamber, on the housing there being formed an air inlet, a central air outlet, and two side air outlets. The device also includes a drum flap mounted rotatably about an axis (z) orthogonal to a direction that goes from the air inlet to the central air outlet. The flap is movable between a first position, wherein the air inlet is closed by the flap; a second position, wherein the two side air outlets are closed by the flap and an air flow between the air inlet and the central air outlet is allowed; and a third position, wherein the central air outlet is closed by the flap and an air flow between the air inlet and the side air outlets is allowed.

6 Claims, 3 Drawing Sheets

AIR DISTRIBUTING DEVICE FOR AN AIR CONDITIONING UNIT OF A MOTOR VEHICLE

CROSS-REFERENCE TO RELATED APPLICATIONS

This application claims the benefit of priority to Italian Patent Application No. 102018000009130, filed Oct. 3, 2018, the entire contents of which are hereby incorporated by reference herein.

FIELD OF THE INVENTION

The present invention refers to an air distributing device for an air conditioning unit of a motor vehicle, of the type used to distribute air to the rear seats of a cabin of the motor vehicle.

BACKGROUND

In general, the air distribution units for the rear seats are located at the central tunnel of the dashboard of the motor vehicle. The ducts that bring air to the front air vents of the rear seats and to the air vents at the foot of the rear seats initiate from these air distribution units.

In such an installation configuration, the available space may be very limited.

BRIEF DESCRIPTION

One object of the invention is therefore to make available an air distributing device that has a construction as simple and compact as possible, so as to make the installation possible even when the space requirements are very stringent, while retaining air passage sections suitable to ensure good acoustic and fluid-dynamic performance.

For this object, an air distributing device for an air conditioning unit of a motor vehicle is the subject-matter of the invention, the device comprising
  a housing defining an air intake chamber, on the housing there being formed an air inlet by means of which the air intake chamber may be supplied with an air flow, a central air outlet located in front of the air inlet and two side air outlets arranged on opposing sides of the housing, and
  obturating and deflecting means for distributing the air flow to said air outlets;
  wherein said obturating and deflecting means comprise a drum flap rotatably mounted about an axis z orthogonal to a direction running from the air inlet to the central air outlet to control the distribution of the air flow to the central air outlet and to the side air outlets, said flap comprising two flat side flap portions that are parallel to each other, and a circular arch-shaped central flap portion interconnecting the two side flap portions,
  wherein the flap is movable between a first position, wherein the air inlet is closed by the central portion of the flap; a second position, wherein the two side air outlets are closed by the flap, the air intake chamber is entirely in fluid communication with the air inlet and with the central air outlet and an air flow between the air inlet and the central air outlet is allowed; and a third position, wherein the central air outlet is closed by the central portion of the flap, the air intake chamber is entirely in fluid communication with the air inlet and with the side air outlets and an air flow between the air inlet and the side air outlets is allowed.

The device according to the invention may therefore be made with a minimum number of components and moving parts and, consequently, with very limited overall dimensions. Moreover, due to the particular arrangement of the passages and to the use of a simple drum flap, it is possible to size the device in such a way as to obtain air passage sections suitable to ensure good acoustic and fluid-dynamic performance.

BRIEF DESCRIPTION OF THE DRAWINGS

Further features and advantages of the device according to the invention will become more apparent in the following detailed description of an embodiment of the invention, made with reference to the accompanying drawings, provided purely to be illustrative and non-limiting, wherein.

DETAILED DESCRIPTION

The figures show a part of an air conditioning unit for a motor vehicle, having a case indicated collectively at 10.

Such case 10 is made of plastic material and is conventionally configured in such a way as to have therein a set of passages for an air flow to be treated and introduced into the cabin of a motor vehicle.

Figure 2A:
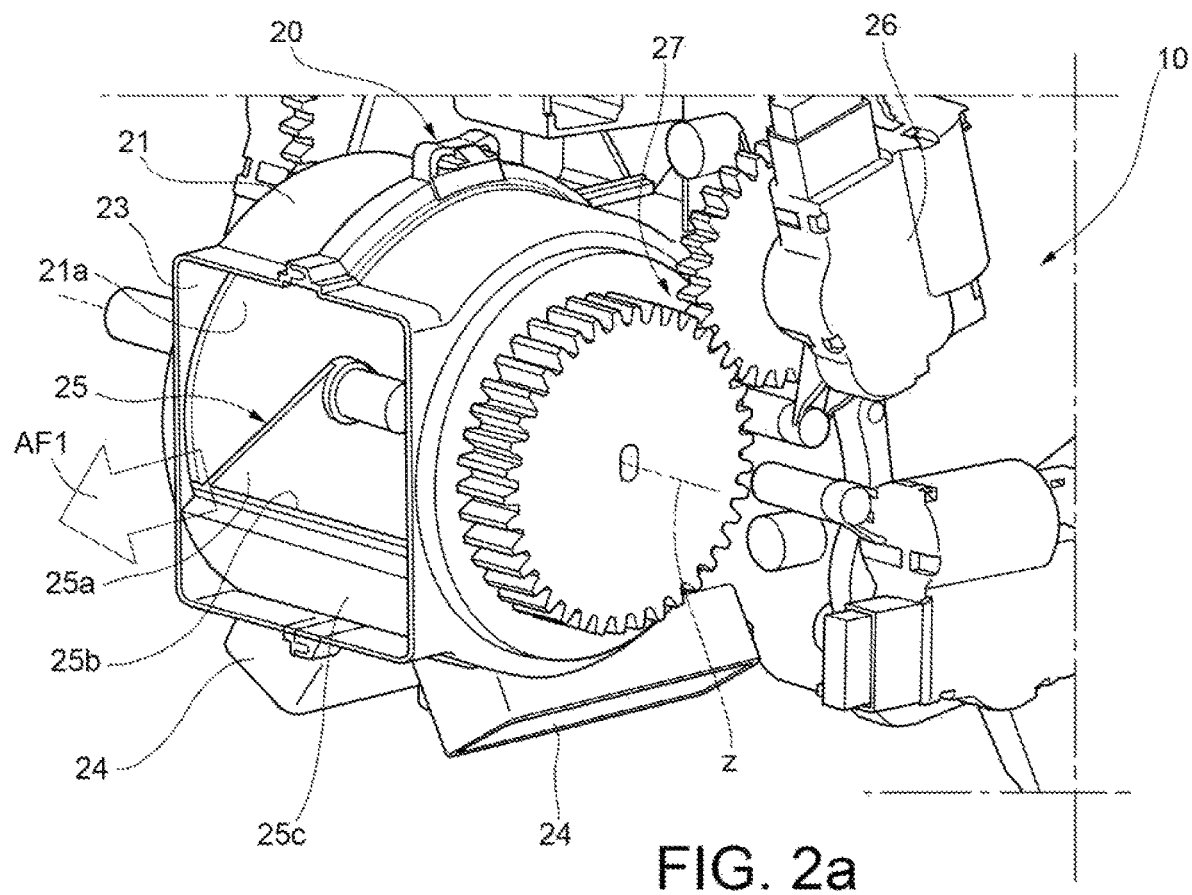
FIGS. 2a and 2b show views of a part of an air conditioning unit provided with the air distributing device according to the invention, in a second operating position.
Figure 2B:
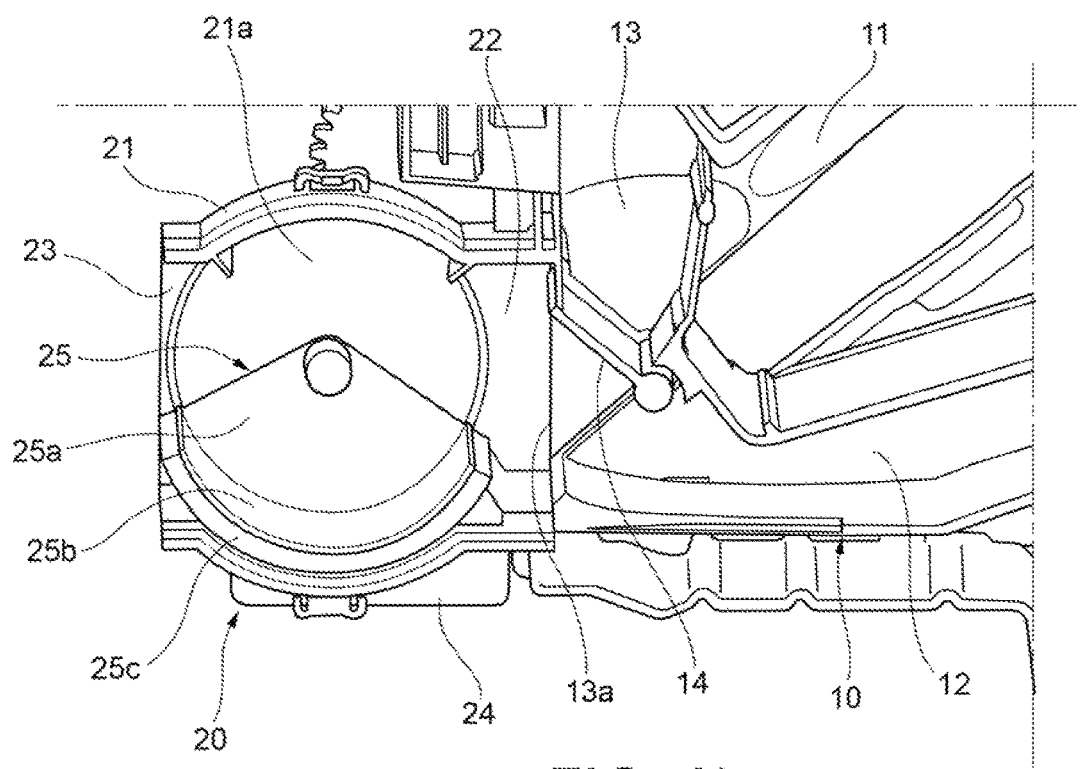
Figure 3A:
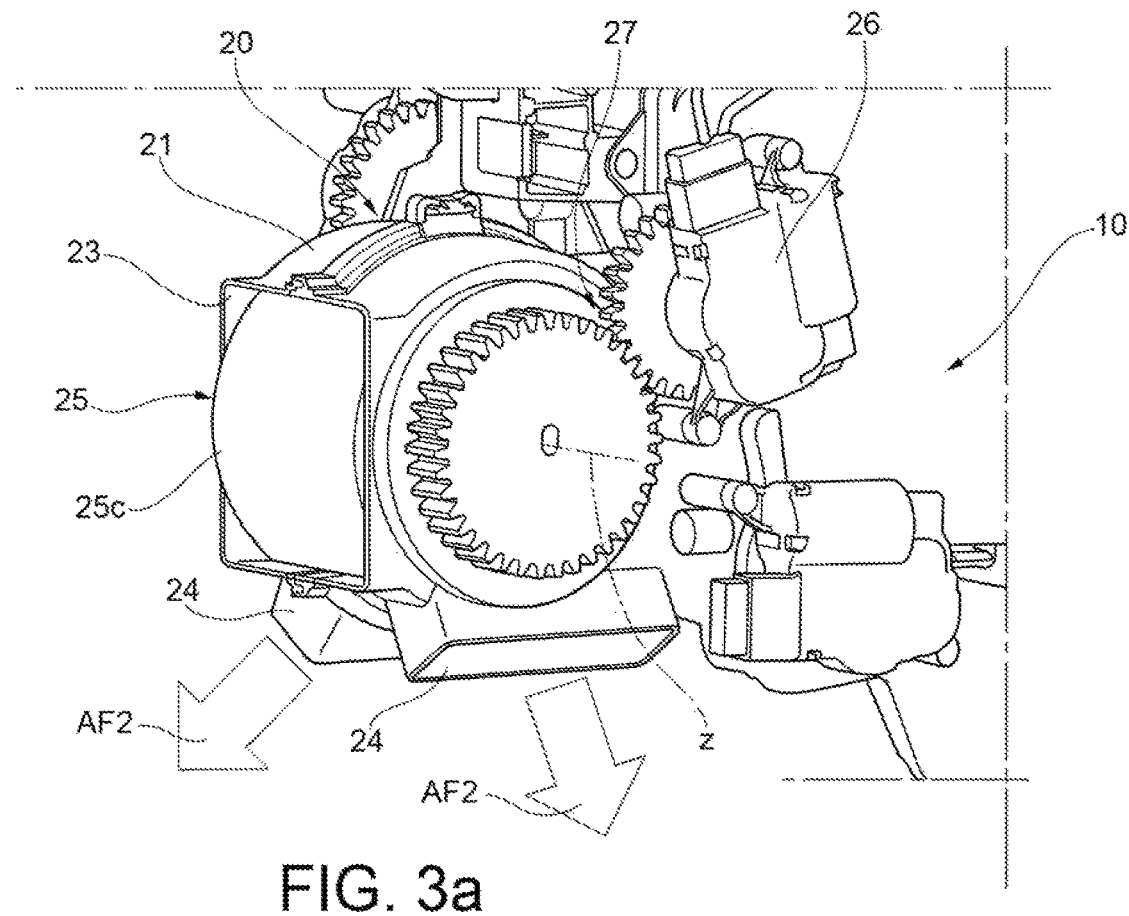
FIGS. 3a and 3b show views of a part of the air conditioning unit provided with the air distributing device according to the invention, in a third operating position.
Figure 3B:
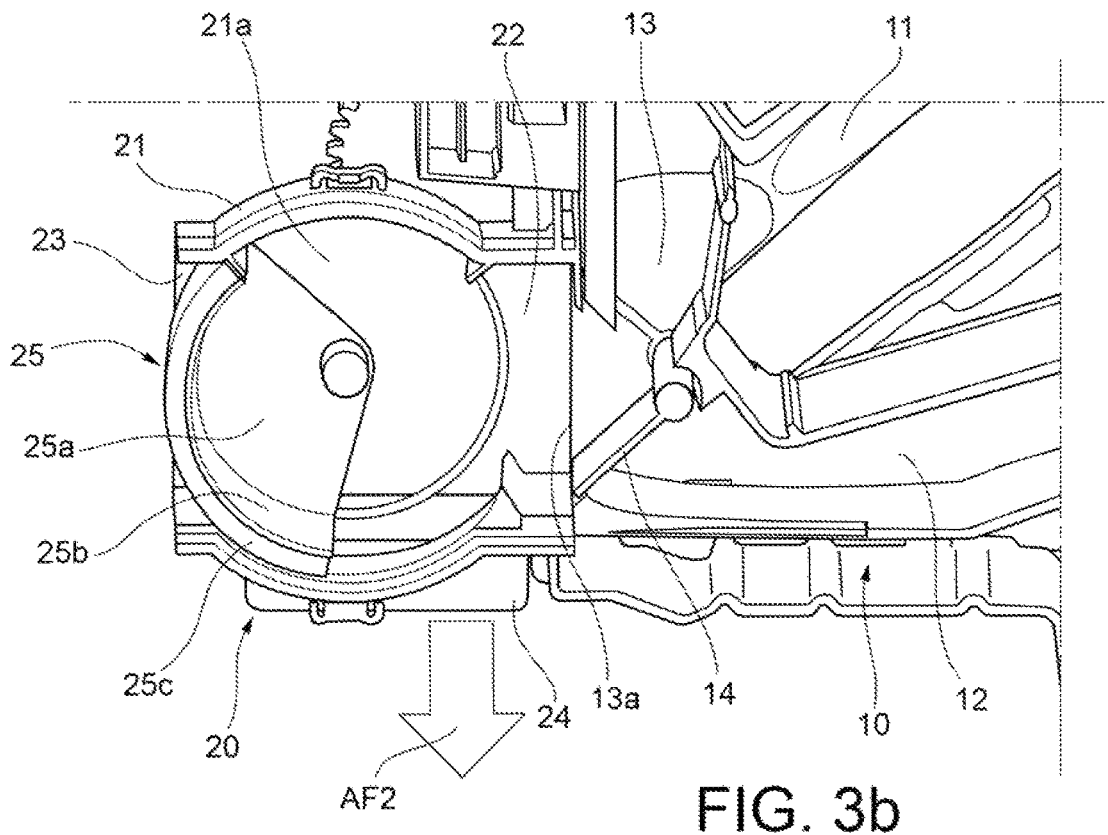

In particular, in FIGS. 2b and 3b a hot air passage 11 and a cold air passage 12 are identified. Conventionally, the hot air passage 11 comes from an area (not shown) of the air conditioning unit wherein a heating device is located, while the cold air passage 12 comes from an area (not shown) of the air conditioning unit without a heater device.

The hot air passage 11 and the cold air passage 12 converge into a mixing chamber 13, inside of which hot air and cold air may be mixed if necessary. In the mixing chamber 13 there are provided one or more flaps 14 which are controlled by means of dedicated actuators or mechanisms to regulate the mixing of the conditioned air supplied by the air conditioning unit. The mixing chamber 13 has an air outlet 13a.

On the housing 10 of the air conditioning unit is mounted the housing 21 of an air distribution group 20 adapted to distribute air to the rear seats of the cabin of the motor vehicle. The housing 21 defines an air intake chamber 21a therein. The housing 21 of the air distribution group 20 therefore has an air inlet 22, which in the example shown joins with the air outlet 13a of the mixing chamber 13, and through which the air intake chamber 21a may be powered with the flow of air coming from the air conditioning unit.

On the housing 21 there is further obtained a central air outlet 23 placed in front of the air inlet 22 and two side air outlets 24 located on opposite sides of the housing 21.

The central air outlet 23 may be connected to the front ventilation vents (not shown) of the rear seats of the vehicle. The side air outlets 24 may be connected to ventilation vents for the feet (not shown) of the rear seats of the motor vehicle.

Obturating and deflecting means are arranged inside the air intake chamber 21a to distribute the air flow to the air outlets 23 and 24.

In particular, these obturating and deflecting means comprise a drum flap 25 mounted rotatably around an axis z orthogonal to a direction leading from the air inlet 22 to the central air outlet 23 to control the distribution of the air flow to the central air outlet 23 and to the side air outlets 24. In the example shown, the flap 25 is mounted on opposing pins on the side panels of the housing 21.

The air inlet 22, the side air outlets 24 and the central air outlet 23 are positioned along a circular arch trajectory of the flap 25.

The flap 25 comprising two flat side flap portions 25a parallel to each other, extending radially outwards from the axis of rotation of the flap 25, and a circular arch-shaped central flap portion 25b that interconnects the two side flap portions 25a. On the radially outer circular surface of the central flap portion 25b there may be a gasket layer 25c.

The movement of the flap 25 may be controlled by an actuator 26, which is operatively connected to the flap 25 by a reduction gear mechanism 27.

Figure 1:
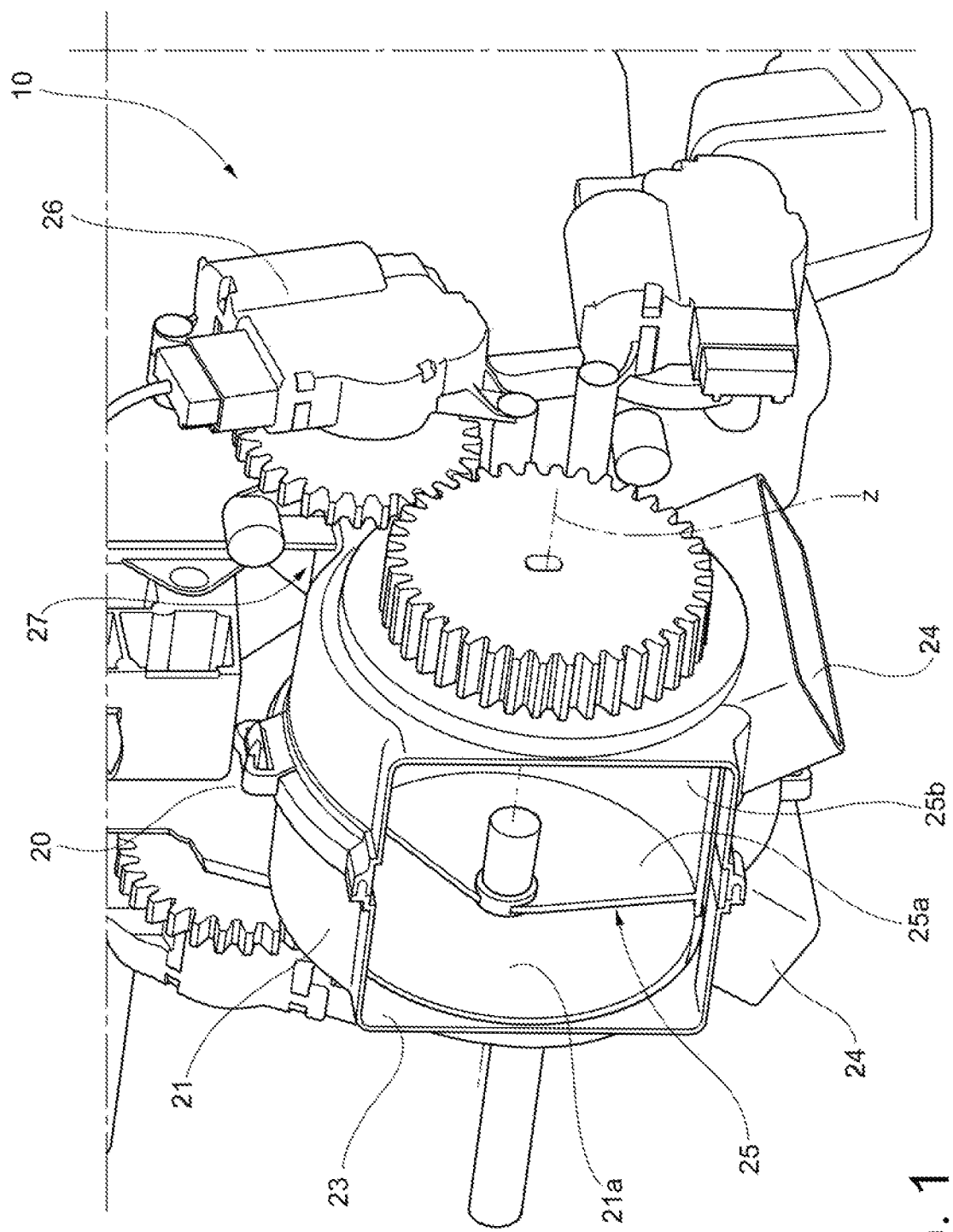
FIG. 1 shows a view of a part of an air conditioning unit provided with an air distributing device according to the invention, in a first operating position.

The drum flap 25 is movable between a first position (FIG. 1), wherein the air inlet is closed by the flap 25; a second position (FIGS. 2a and 2b), wherein the two side air outlets 24 are closed by the flap 25 and an air flow (arrow AF1 in FIG. 2a) between the air inlet 22 and the central air outlet 23 is allowed; and a third position (FIGS. 3a and 3b), wherein the central air outlet 23 is closed by the flap 25 and an air flow (arrow AF2 in FIGS. 3a and 3b) between the air inlet 22 and the side air outlets 24 is allowed.

In the first and third position the air inlet 22 and respectively the central air outlet 23 are closed by the central portion 25b of the flap 25.

In the second position, the side air outlets 24 are closed by respective edge portions of the flap 25 between the central portion 25b and the side portions 25a.

In the second position, the air intake chamber 21a is entirely in fluid communication with the air inlet 22 and with the central air outlet 23. In the third position, the air intake chamber 21a is entirely in fluid communication with the air inlet 22 and with the side air outlets 24. In other words, in the second and third positions, the entire volume of the air intake chamber, with the obvious exception of the space occupied by the flap, is in communication with the respective openings. Which is to say, inside the intake chamber, the flap defines a single space that is affected by the air flow, without creating dead spaces. In this way, all the space available inside the housing 21 is used to manage the different air distribution functions, corresponding to the different positions of the flap.

According to a specific embodiment, the first position shown in the figure corresponds to a defrost position of the air conditioning unit, wherein the hot air produced by the air conditioning unit is all used to defrost the entire windscreen of the vehicle, and therefore the air inlet 22 of the rear air distributing device 20 is closed.

The second position shown in FIGS. 2a and 2b may correspond to an open rear front ventilation position and a closed foot ventilation position.

The third position shown in FIGS. 3a and 3b may correspond to an open foot ventilation position and a closed rear front ventilation position.

In the above example, the device is constructed as a separate unit from the air conditioning unit and may be attached to the housing 10 of the air conditioning unit.

According to an alternative embodiment (not shown), the air distribution group may be integrated into the air conditioning unit.

According to another embodiment (not shown), the air distribution group may also be obtained as a separate unit from the air conditioning unit, but configured to be positionable at a distance from the air conditioning unit. In this case, the connection between the mixing chamber 13 of the air conditioning unit and the air intake chamber 21a of the air distributing device 20 may be provided by a duct that interconnects the two systems.

It is understood that the invention is not limited to the embodiments described and illustrated herein, but rather may undergo modifications relating to the shape and arrangement of parts, construction and operating details according to the numerous possible variants which will appear suitable to persons skilled in the art and which are to be understood as comprised in the scope of the invention, as defined by the following claims.

The invention claimed is:

1. An air distributing device for an air conditioning unit of a motor vehicle, the device configured to distribute air to rear seats of a cabin of the motor vehicle, the device comprising:
   a housing defining an air intake chamber, on the housing there being formed an air inlet by means of which the air intake chamber may be supplied with an air flow, a central air outlet located in front of the air inlet, and two side air outlets arranged on opposing sides of the housing, and
   a drum flap for distributing the air flow to the air outlets;
   wherein the drum flap is rotatably mounted about an axis orthogonal to a direction running from the air inlet to the central air outlet to control a distribution of the air flow to the central air outlet and to the side air outlets, the drum flap comprising two flat side flap portions parallel to each other, and a circular arch-shaped central flap portion interconnecting the two side flap portions, and
   wherein the drum flap is movable between a first position, in which the air inlet is closed by the central flap portion of the drum flap; a second position, in which the two side air outlets are closed by the drum flap, the air intake chamber is entirely in fluid communication with the air inlet and with the central air outlet, and an air flow between the air inlet and the central air outlet is allowed; and a third position, in which the central air outlet is closed by the central flap portion of the drum flap, the air intake chamber is entirely in fluid communication with the air inlet and the side air outlets, and an air flow between the air inlet and the side air outlets is allowed.

2. The device according to claim 1, wherein the air inlet, the side air outlets, and the central air outlet are positioned along a circular arch trajectory of the drum flap.

3. The device according to claim 1, wherein in the second position, the side air outlets are closed by respective edge portions of the drum flap between the central flap portion and the side flap portions.

4. The device according to claim 1, wherein the device is a separate unit from the air conditioning unit configured to supply conditioned air to the device.

5. The device according to claim 4, wherein the housing of the device is fixed to a housing of the air conditioning unit.

6. The device according to claim 4, wherein the housing of the device is positioned away from the air conditioning unit.

\* \* \* \* \*